United States Patent Office 3,822,291
Patented July 2, 1974

3,822,291
4,7-DIHYDRO-2-(3-PENTYL)-1,3-DIOXEPIN
Robert F. Tavares, Cedar Grove, N.J., Jack Agran, Brooklyn, N.Y., and William M. Easter, Hasbrouck Heights, and Leslie Blau, Dumont, N.J., assignors to Givaudan Corporation, Clifton, N.J.
No Drawing. Filed Mar. 16, 1973, Ser. No. 342,122
Int. Cl. C07d *17/00*
U.S. Cl. 260—338                1 Claim

ABSTRACT OF THE DISCLOSURE

An unsaturated cyclic acetal, 4,7-dihydro-2-(3-pentyl)-1,3-dioxepin, prepared by the condensation of 2-butene-1,4-diol with 2-ethyl-1-butanal is useful as a flavor agent for foods and an odorant for perfumes.

BACKGROUND OF THE INVENTION

(1) Field of Invention

This invention relates to a novel unsaturated cyclic acetal and, more specifically, to a novel dioxepin compound and its use as a flavor agent for foods and as an odorant for perfumes.

(2) The Prior Art

It is known to the art to condense aldehydic compounds with polyhydric alcohols to prepare the corresponding cyclic acetals. However, it has not been known heretofore that the condensation of the unsaturated polyhydric alcohol, 2-butene-1,4-diol with the aldehyde, 2-ethyl-1-butanal, would result in an unsaturated cyclic acetal which would have properties rendering the compound especially useful as a food flavor agent as well as a perfume odor agent. As will hereinafter be disclosed, saturated cyclic acetal compounds closely related structurally to the unsaturated cyclic acetal compound of the present invention do not exhibit the flavor and odor properties exhibited by the unsaturated cyclic acetal of the present invention, 4,7-dihydro-2-(3-pentyl)-1,3-dioxepin.

SUMMARY OF THE INVENTION

In accordance with the present invention, there is provided the unsaturated cyclic acetal, 4,7-dihydro-2-(3-pentyl)-1,3-dioxepin, the acetal being useful as a flavor agent for foods and as an odorant for perfumes. When added in minor amounts to food preparations, the unsaturated cyclic acetal compound of the present invention imparts a taste to foods described as vegetative, earthy, celery, parsley and very carrot-like in character. The compound also imparts a natural, rooty, earthy odor to perfume formulations.

The compound of the present invention, 4,7-dihydro-2-(3-pentyl)-1,3-dioxepin possesses all the flavor characteristics of a freshly picked carrot and finds particular utility as a carrot flavor and as a substitute for natural carrot seed oil which is presently used extensively for culinary purposes, as for example, in spice blends and seasonings. The relative strength of the "fresh carrot flavor" exhibited by the 4,7-dihydro-2-(3-pentyl)-1,3-dioxepin is substantially equivalent to natural carrot seed oil. The imitation carrot flavor exhibited by the 4,7-dihydro-2-(3-pentyl)-1,3-dioxepin is achieved at a cost which is substantially less than that of carrot seed oil ($30–$35 per pound) but, in addition, the flavor of the dioxepin of the present invention possesses the freshness of the real carrot, a quality lacking in carrot seed oil.

PREFERRED EMBODIMENTS

The compound of the present invention, 4,7-dihydro-2-(3-pentyl)1,3-dioxepin is prepared by the condensation of 2-butene-1,4-diol with 2-ethyl-1-butanal in accordance with the following equation:

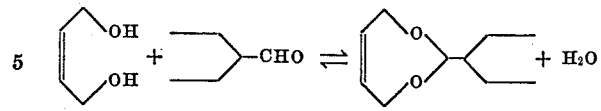

In preparing the unsaturated cyclic acetal, it is preferred to react an equimolar quantity of the 2-butene-1,4-diol and 2-ethyl-1-butanal, but an excess of either can be used.

The condensation reaction is preferably affected by incorporating into the reaction medium a catalytic amount, e.g., about 0.1 to 2% by weight of an acidic catalyst such as an organic or inorganic acid catalyst, for example, an inorganic acid catalyst such as phosphoric acid, a lower alkyl phenyl sulphonic acid such as para-toluene sulfonic acid or a polycarboxylic acid such as citric acid or tartaric acid. The condensation reaction is also preferably conducted by reacting the reagents in the presence of the acid catalyst in an inert reaction solvent. The reaction olvent is suitably an organic compound inert to the reactants and to the unsaturated cyclic acetal reaction product and which forms with water a two-phase azeotrope. Suitable reaction solvents include aliphatic hydrocarbons such as hexane and cyclohexane and aromatic hydrocarbons such as benzene, toluene, xylene and the like.

The condensation reaction can be conducted at room temperature (37° C.) or even lower, but is preferably conducted at elevated temperatures (up to 200° C. of even even higher and most preferably is conducted at the boiling point of the two-phase azeotrope that is formed until no further water of condensation separates in a Dean-Stark trap. The time required for the reaction to go to completion (i.e., when no further water of condensation separates in the Dean-Stark trap) can also vary over a wide range (from less than 10 minutes to well over 48 hours) depending upon any particular set of reaction conditions selected (i.e., the particular catalyst, solvent, if any, or apparatus used, whether or not the reaction is conducted at elevated temperatures, the scale on which the reaction is conducted, the relative amounts of the reactants and products present in the reaction, the efficiency with which water is removed from the reaction to increase the rate at which the equilibrium is shifted in the desired direction, etc.).

After completion of the condensation reaction, the reaction mixture is cooled, if the reaction is conducted at elevated temperatures, generally to room temperature and washed with a base such as a suitably concentrated sodium hydroxide to destroy the catalytic activity of the acidic catalyst and thereby prevent a reversal of the equilibrium of the reaction. The mixture is then washed with water to neutrality and the reaction medium solvent is thereupon removed by distillation and the residue distilled under reduced pressure.

The compound 4,7-dihydro-2-(3-pentyl)-1,3-dioxepin may be used directly as a flavoring agent and be added to foods in relatively minor amounts. Alternatively, the compound may be added to foods as a blend with other chemicals to prepare synthetic flavoring agents. When added to food flavoring agents (i.e., compositions added to foods to impart desirable flavors thereto), the dioxepin is present in the composition at a level ranging from about 0.001 to 100% by weight, the 100% weight range representing, of course, the instance where the dioxepin of the present invention is used as the flavoring agent, per se, and is added to foods directly to impart desirable flavors thereto. The methods by which the dioxepin can be blended with other ingredients are well known to those familiar with the art. The exact concentrations of ingredients will depend, of course, on the food and preference of the blender.

When added to food flavoring agents, the vegetative, earthy, green, celery, parsley and carrot-like flavor of the 4,7-dihydro-2-(3-pentyl)-1,3-dioxepin provides a variety of useful flavor effects in the food flavoring agent. For example, when incorporated in berry flavors such as imitation strawberry and raspberry flavors at a concentration of 0.01 to 5 weight percent, the dioxepin imparts a green, earthy effect to the flavor which is most advantageous and desirable in imitation flavors. When incorporated in imitation vegetable flavors and especially imitation celery, parsley and carrot flavors, the dioxepin compound enhances the vegetative flavor of the formulation.

When blended with the aromatic oils and concentrates used in the perfume art, the 4,7-dihydro-2-(3-pentyl)-1,3-dioxepin imparts a natural, rooty, earthy note to such formulations. Of particular benefit of the dioxepin in perfume formulations is that the dioxepin compound of the present invention imparts an earthy note to perfume formulations without imparting a chemical note to the formulation which generally occurs with other synthetic odorants used for this purpose.

The following Examples are provided to illustrate further the practice of the present invention, but are for purposes of illustration of preferred embodiments only and should not be construed as limiting.

EXAMPLE I

Preparation of 4,7-dihydro-2-(3-pentyl)-1,3-dioxepin

To a one liter flask equipped with heating jacket, agitator and condenser fitted with a Dean-Stark trap was charged 100 grams (1.0 mole), 2-ethyl-butanal, 97 grams (1.1 mole) 2-butene-1,4-diol, 80 grams cyclohexane and 0.2 grams p-toluenesulfonic acid monohydrate. The mixture was heated with vigorous agitation at reflux (84–99° C.) until water no longer continued to be distilled from the reaction mixture (1.2 hours). The reaction mixture was cooled to room temperature and the p-toluenesulfonic acid neutralized by washing the reaction mixture with a 5% aqueous solution of sodium hydroxide. The reaction mixture was then washed neutral with water and distilled to remove the cyclohexane. The oil was vacuum distilled to obtain 146 grams (86% of theoretical) of 4,7-dihydro-2-(3-pentyl)-1,3-dioxepin having a boiling point of 47° C. at a pressure of 1.0 millimeter of mercury, (refractive index, $N_D^{20}=1.457$). Analysis for carbonyl content by IR showed 0.0% carbonyl and VPC analysis showed the compound to have a purity of 100%.

EXAMPLE II

Use of 4,7-dihydro-2-(3-pentyl)-1,3-dioxepin in an Imitation Flavor

A synthetic carrot flavor was formulated using the 4.7-dihydro-2-(3-pentyl)-1,3-dioxepin prepared as in Example I with auxiliary chemicals to obtain an imitation carrot flavor at a dioxepin concentration of 55.0 parts by weight. The composition of the synthetic carrot flavor is provided in Table I below.

TABLE I

Imitation carrot flavor

| Chemical additive: | Parts by weight |
|---|---|
| 4,7-Dihydro-2-(3-pentyl)-1,3-dioxepin | 55.0 |
| α-Pinene | 0.5 |
| β-Pinene | 0.5 |
| Myrcene | 0.5 |
| Phenylacetic acid | 0.5 |
| α-Terpineol | 0.3 |
| Isopulegol acetate | 8.0 |
| Oil lovage | 5.0 |
| 3-Propylidene phthalide | 3.0 |
| Benzyl benzoate | 18.7 |
| d-Limonene | 8.0 |

The 4,7-dihydro-2-(3-pentyl)-1,3-dioxepin is the primary ingredient of the imitation flavor of the composition of Table I and is responsible for the fresh carrot quality of the imitation flavor. In the absence of the 4,7-dihydro-2-(3-pentyl)-1,3-dioxepin in the imitation flavor formulation, the formulation lacks any carrot flavor and is devoid of any utility as an imitation flavor.

In addition to being used as an imitation carrot flavor, the 4,7-dihydro-2-(3-pentyl)-1,3-dioxepin has been found to transform a tomato flavor into a flavor reminiscent of an imitation vegetable cocktail flavor when incorporated in the known imitation tomato flavor at a concentration of 0.1 percent by weight. Further experimentation has indicated that when incorporated at a level of 0.05% in a known celery enhancer, the addition of 4.7-dihydro-2-(3-pentyl)-1,3-dioxepin adds lift and strength to the celery enhancer while concomitantly imparting a pleasant nuance of seediness.

EXAMPLE III

Use of 4,7-dihydro-2-(3-pentyl)-1,3-dioxepin as an Odorant

An orris root formulation was prepared with the ingredients set forth in Table II below using the 4,7-dihydro-2-(3-pentyl)-1,3-dioxepin prepared according to Example I. The dioxepin provides a fresh, earthy rooty note to the formulation which is natural and provides these notes without imparting an undesirable "chemical" side note. Without the 4,7-dihydro - 2 - (3-pentyl)-1,3-dioxepin in the orris root formulation, the formulation is found to be lacking in earthy and rooty notes.

TABLE II

Orris root formulation

| Ingredient: | Parts by weight |
|---|---|
| 4,7-Dihydro - 2 - (3-pentyl)-1,3-dioxepin | 20 |
| Orris absolute | 10 |
| Methyl ionone γ | 350 |
| Folrosia (trademark) | 2 |
| Ironal | 18 |
| Versalide (trademark) | 20 |
| Cedarwood Oil (American) | 300 |
| Dipropylene glycol | 280 |

For purposes of contrast, the procedure of the Example I was repeated with the exception that 1.1 mole concentrations of a variety of saturated aliphatic diols closely related structurally to 2-butene-1,4-diol were substituted for the 2-butene-1,4-diol in the reaction mixture used in the Example I to prepare a series of saturated cyclic acetals. The saturated cyclic acetals prepared in this manner are listed in Table III below.

TABLE III.—SATURATED CYCLIC AGETALS

| Compound number | Cyclic acetal | Diol reacted with 2-ethyl butanal to prepare acetal |
|---|---|---|
| 1 | 2-(3-pentyl)-1,3-dioxepane | 1,4-butanediol. |
| 2 | 4-methyl-2-(3-pentyl)-m-dioxane | 1,3-butanediol. |
| 3 | 5,5-dimethyl-2-(3-pentyl)-m-dioxane | 2,2-dimethyl-1,3-propanediol. |
| 4 | 2-(3-pentyl)-4,4,6-trimethyl-m-dioxane | 2-methyl-2,4-pentanediol. |

None of the saturated cyclic acetals listed in Table III exhibited any useful flavor or ordorant properties. When it was attempted to prepare flavor compositions of the type illustrated in Example II above by substituting a saturated cyclic acetal of Table III for 4,7-dihydro-2-(3-pentyl)-1,3-dioxepin, no useful imitation flavor was obtained.

When it was attempted to prepare odorant compositions of the type illustrated in Example III above by substituting a saturated cyclic acetal of Table III for 4,7-dihydro-2-(3-pentyl)-1,3-dioxepin, such odorant compositions could not be considered useful in perfumery.

What is claimed is:
1. 4,7-Dihydro-2-(3-pentyl)-1,3-dioxepin.

References Cited
UNITED STATES PATENTS

| | | | |
|---|---|---|---|
| 3,116,298 | 12/1963 | Sterling et al. | 260—338 |
| 3,240,702 | 3/1966 | Monroe | 260—338 |
| 3,410,871 | 11/1968 | Sturzenegger et al. | 260—338 |
| 3,584,010 | 6/1971 | Marbet | 260—338 |

OTHER REFERENCES

Kent C. Brannock et al., Jour. Org. Chem., Vol. 21 (1956), pp. 1366–68.

Dexter B. Pattison, Jour. Org. Chem., Vol. 22 (1957), pp. 662–664.

Chemical Abstracts, Vol. 72 (1970).

NORMA S. MILESTONE, Primary Examiner

U.S. Cl. X.R.

252—522; 426—65, 175

UNITED STATES PATENT OFFICE
CERTIFICATE OF CORRECTION

Patent No. 3,822,291  Dated July 2, 1974

Inventor(s) Robert F. Tavares et al.

It is certified that error appears in the above-identified patent and that said Letters Patent are hereby corrected as shown below:

Column 2, line 22, "olvant" should read -- solvent --.

Column 2, line 30, "of even" should read -- or --.

Signed and Sealed this

Twenty-seventh Day of July 1976

[SEAL]

Attest:

RUTH C. MASON
Attesting Officer

C. MARSHALL DANN
Commissioner of Patents and Trademarks